(12) United States Patent
Yang et al.

(10) Patent No.: US 7,051,081 B2
(45) Date of Patent: May 23, 2006

(54) SERVER SYSTEM AND METHOD FOR AUTOMATIC STORAGE AND RETRIEVAL SYSTEM

(75) Inventors: Chih-Chin Yang, Taipei (TW); Ming-Hsiao Hsieh, Taipei (TW)

(73) Assignee: Inventec Corporation, Taipei (TW)

( * ) Notice: Subject to any disclaimer, the term of this patent is extended or adjusted under 35 U.S.C. 154(b) by 680 days.

(21) Appl. No.: 10/172,974

(22) Filed: Jun. 18, 2002

(65) Prior Publication Data

US 2003/0135598 A1 Jul. 17, 2003

(30) Foreign Application Priority Data

Dec. 26, 2001 (TW) .............................. 90132279 A

(51) Int. Cl.
*G06F 15/16* (2006.01)
(52) U.S. Cl. ........................................ 709/217; 707/10
(58) Field of Classification Search ........ 709/223–224, 709/217, 248, 219; 707/3, 10; 705/28
See application file for complete search history.

(56) References Cited

U.S. PATENT DOCUMENTS

| | | | | |
|---|---|---|---|---|
| 6,477,503 | B1 * | 11/2002 | Mankes | 705/5 |
| 6,748,292 | B1 * | 6/2004 | Mountz | 700/214 |
| 2002/0059121 | A1 * | 5/2002 | Schneider et al. | 705/28 |
| 2002/0095399 | A1 * | 7/2002 | Devine et al. | 707/1 |
| 2004/0199636 | A1 * | 10/2004 | Brown et al. | 709/227 |
| 2004/0249497 | A1 * | 12/2004 | Saigh et al. | 700/216 |

* cited by examiner

Primary Examiner—Abdullahi E. Salad
(74) Attorney, Agent, or Firm—Finnegan, Henderson, Farabow, Garrett & Dunner L.L.P.

(57) ABSTRACT

A server system and method is proposed for use with an automatic storage and retrieval system (AS/RS) to allow a user to perform AS/RS controls and access related inventory management data. The proposed AS/RS server system and method is characterized by the use of a point-to-point multiplex communication interface, such as a TCP/IP communication interface, instead of SQL server as in the case of the prior art, for performing data transmission between the control platform and the main server. The SQL server is only used for storing the history of user-issued commands and related AS/RS operating status data. Compared to the prior art, the proposed AS/RS server system and method allows the utilization of DCOM (Distributed Component Object Model) modules for control of the data exchange among the main server, the SQL server, and the control platform, so that it can be implemented without the use of QEODBC drivers, thereby eliminating the problems caused by the use of QEODBC driver in the prior art. In addition, the proposed AS/RS server system and method allows real-time synchronization in the data transmission between the control platform and the automatic storage and retrieval system, thereby making the AS/RS operation more efficient than the prior art.

21 Claims, 5 Drawing Sheets

SERVER SYSTEM AND METHOD FOR AUTOMATIC STORAGE AND RETRIEVAL SYSTEM

BACKGROUND OF THE INVENTION

1. Field of the Invention

This invention relates to information technology, and more particularly, to a server system and method for automatic storage and retrieval system (AS/RS) that allows the user to perform AS/RS controls and access related inventory management data.

2. Description of Related Art

An automatic storage and retrieval system (AS/RS) is an inventory control and management system that allows a company to carry out its inventory control and management tasks more efficiently through the use of computerized automation and information technology.

FIG. 1 shows the system architecture of a conventional AS/RS server system. As shown, this conventional AS/RS server system (as the part enclosed in the dashed box indicated by the reference numeral 100) is integrated to an automatic storage and retrieval system 10 to allow users (i.e., inventory management personnel) to perform AS/RS controls and access related inventory management data.

This conventional AS/RS server system 100 comprises: (a) a main server 110; (b) an SQL server 120; and (c) at least one control platform 130.

The main server 110 is linked directly to the AS/RS 10, and is used to monitor the operations of the AS/RS 10 and control the automatic storage and retrieval system 10 to perform user-issued commands. In addition, the main server 110 is used to store the current AS/RS operating status data into the SQL server 120.

The SQL server 120 is a database server that is compliant with the SQL (Structured Query Language) standard, and which is installed between the main server 110 and the control platform 130 to serve as a data exchange channel therebetween. In addition, the SQL server 120 is used to store the history of user-issued commands from the control platform 130 and all related AS/RS operating status data. Since the SQL standard is a widely-used and well-known standard in the information industry, no detailed description will be given here in this specification.

The control platform 130 is a personal computer unit, such as a desktop computer or a workstation, which is linked to the SQL server 120 to allow the user to operate the AS/RS 10 through the SQL server 120.

During operation, the control platform 130 is used to issue AS/RS control commands and related data to the SQL server 120, and these commands and data are then transferred by the SQL server 120 to the main server 110, causing the main server 110 to control the AS/RS 10 to operate in accordance with the user-issued commands. During this AS/RS operation, the control platform 130 will register all the related storage and retrieval data into the SQL server 120.

Moreover, in implementation, the conventional AS/RS server system 100 of FIG. 1 requires the installation of two ODBC (Open Database Connectivity) drivers, such as QEODBC drivers, respectively at the main server 110 and the control platform 130, so as to allow the main server 110 and the control platform 130 to be capable of exchanging data via the SQL server 120. The use of the ODBC drivers, however, has the following several drawbacks.

First, according to software authorization policy, one unit of QEODBC driver can be installed on only one single computer unit; and therefore, when the control platform 130 is installed in great numbers in the AS/RS server system 100, it requires the purchase of an equal number of units of QEODBC drivers, which would make the AS/RS server system 100 quite costly to implement.

Second, the QEODBC driver is quite complex in setup procedures and whose user interfaces are distributed in various different windows, which make it quite user-unfriendly to use.

Third, in order to allow the main server 110 and the control platform 130 to be capable of exchanging data, the QEODBC driver requires the provision of an AS/RS status register block in the hard disk (not shown) of the SQL server 120 for recording the current operating status of the AS/RS 10. However, since this AS/RS status register block is preset to be refreshed once in a second, it causes the hard disk of the SQL server 120 to undergo one read/write operation for a period of just one second, and this overly-frequent read/write operations would easily cause damage to the hard disk of the SQL server 120.

In addition, the installation of the SQL server 120 between the main server 110 and the control platform 130 would disallow real-time synchronization of data exchange between the main server 110 and the control platform 130; and therefore, the control platform 130 is unable to gain real-time acknowledgement and response of issued-commands to the AS/RS 10 so as to promptly learn the current operating status of the AS/RS 10. Moreover, since the main server 110 would perform intensive read/write operations on the SQL server 120, it would result in an excessive amount of data transmission loading between the main server 110 and the SQL server 120, causing the AS/RS server system 100 to have poor overall performance.

SUMMARY OF THE INVENTION

It is therefore an objective of this invention to provide a new AS/RS server system and method, which can be implemented without the use of QEODBC drivers to help eliminate the problems caused by the use of QEODBC driver in the prior art.

It is another objective of this invention to provide a new AS/RS server system and method, which allows real-time synchronization of data exchange between the control platform and the automatic storage and retrieval system so as to make the AS/RS operation more efficiently.

The AS/RS server system of the invention is designed for use with an automatic storage and retrieval system to allow a user to perform AS/RS controls and access related inventory management data, which is characterized by the use of a point-to-point multiplex communication interface, such as a TCP/IP communication interface, instead of SQL server as in the case of the prior art, for performing data transmission between the control platform and the main server. By the invention, the SQL server is only used for storing the history of user-issued commands and related AS/RS operating status data.

Compared to the prior art, the AS/RS server system of the invention allows the utilization of DCOM (Distributed Component Object Model) modules for control of the data exchange among the main server, the SQL server, and the control platform, so that the invention can be implemented without the use of QEODBC drivers, thereby eliminating the problems caused by the use of QEODBC driver in the prior art. In addition, the invention allows real-time synchronization in the data transmission between the control platform and the automatic storage and retrieval system, thereby making the AS/RS operation more efficient than the prior art.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The AS/RS server system and method according to the invention is disclosed in full details in the following with reference to FIG. 2, FIG. 3, and FIGS. 4A–4B.

Figure 1:
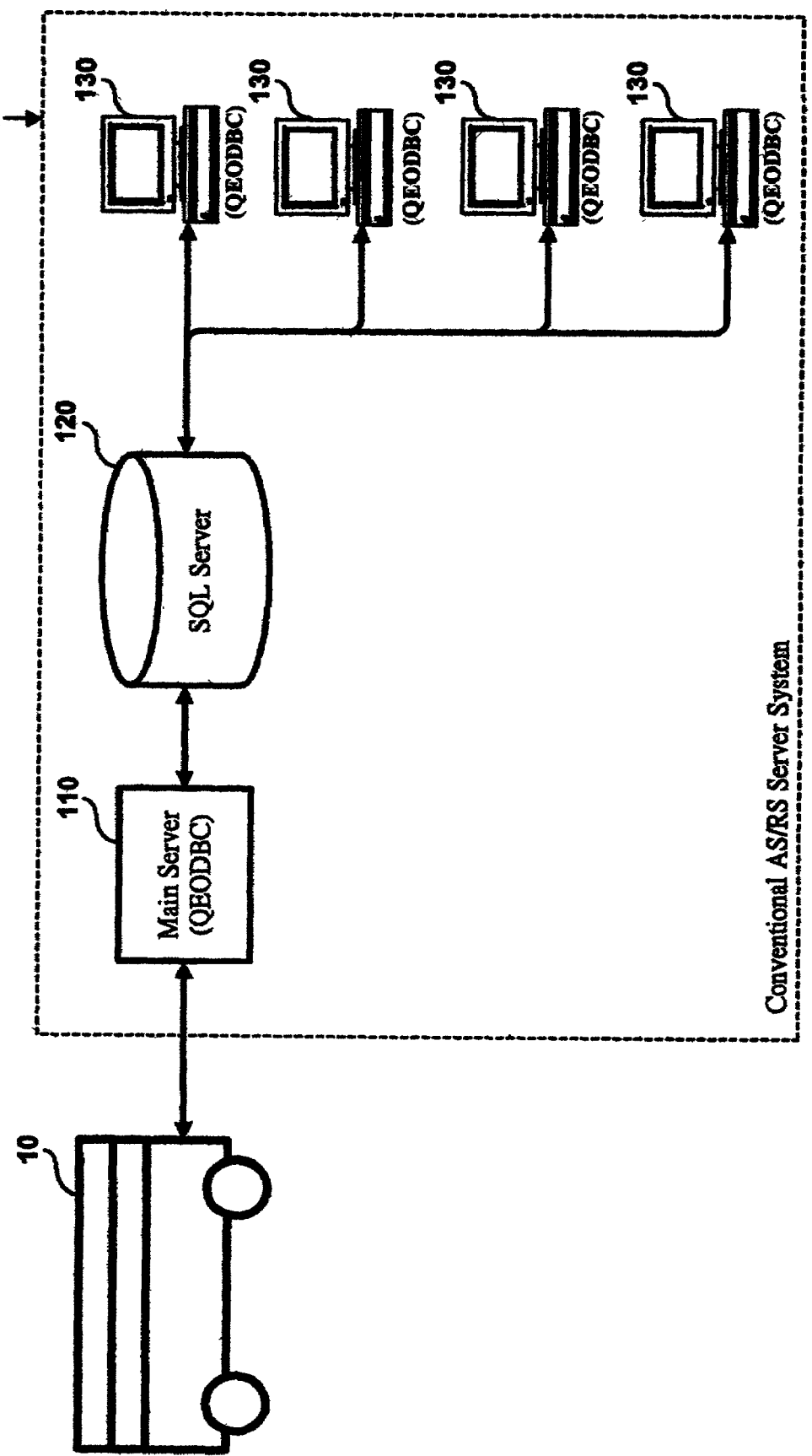
FIG. 1 (PRIOR ART) is a schematic diagram showing the system architecture of a conventional AS/RS server system.
Figure 2:
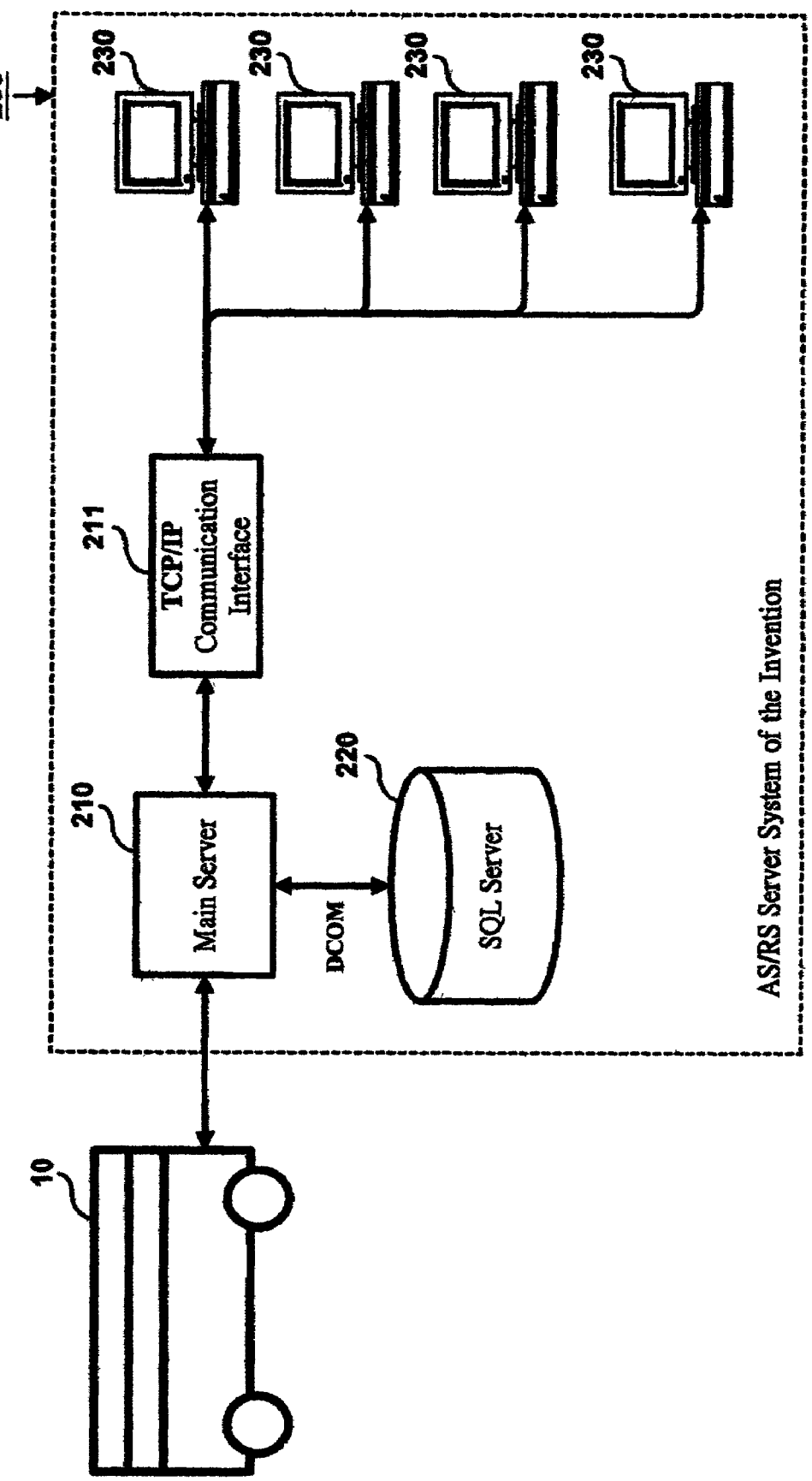
FIG. 2 is a schematic digram showing the system architecture of the AS/RS server system according to the invention.

FIG. 2 shows the system architecture of the AS/RS server system according to the invention (as the part enclosed in the dashed box indicated by the reference numeral 200), which is integrated to an automatic storage and retrieval system 10 to allow users (i.e., inventory management personnel) to perform AS/RS controls and access related inventory management data.

The AS/RS server system of the invention 200 comprises: (a) a main server 210; (b) a communication interface, preferably a point-to-point multiplex communication interface such as a TCP/IP (Transmission Control Protocol/Internet Protocol) communication interface 211; (c) an SQL server 220; and (c) at least one control platform 230.

The main server 210 is linked directly to the AS/RS 10, and is used to monitor the operations of the AS/RS 10 and control the AS/RS 10 to perform user-issued commands. In addition, the main server 210 is used to store AS/RS operating status data into the SQL server 220.

The TCP/IP communication interface 211 is compliant with the TCP/IP (Transmission Control Protocol/Internet Protocol) standard and is installed between the main server 210 and the control platform 230 to allow direct data transfer between the control platform 230 and the main server 210.

The SQL server 220, as the prior art, is linked to the main server 210; but unlike the prior art, it is unlinked to the control platform 230. In other words, the SQL server 220 here serves no purpose as a data exchange channel between the main server 210 and the control platform 230. The SQL server 220 is also used to store the history of user-issued commands from control platform 230 and all the related AS/RS operating status data; and these data are transferred from the main server 210 to the SQL server 220.

The control platform 230 is a personal computer unit, such as a desktop computer or a workstation, which is linked to the SQL server 220 to allow the user to control the operation of the AS/RS 10 through the SQL server 220.

The AS/RS server system of the invention 200 is characterized by the use of the TCP/IP communication interface 211 to directly link the main server 210 to the control platform 230, allowing the commands and data issued by the control platform 230 to be transferred directly to the main server 210, without having to be forwarded by the SQL server 220 as in the case of the prior art. Besides, owing to the use of the TCP/IP communication interface 211 as data exchange channel between the main server 210 and the control platform 230, it allows the use of DCOM (Distributed Component Object Model) modules, which are widely used in network-based windows operating systems, to control the data exchange among the main server 210, the SQL server 220, and the control platform 230, without having to use the more complex and costly QEODBC driver as in the case of the prior art.

Figure 3:
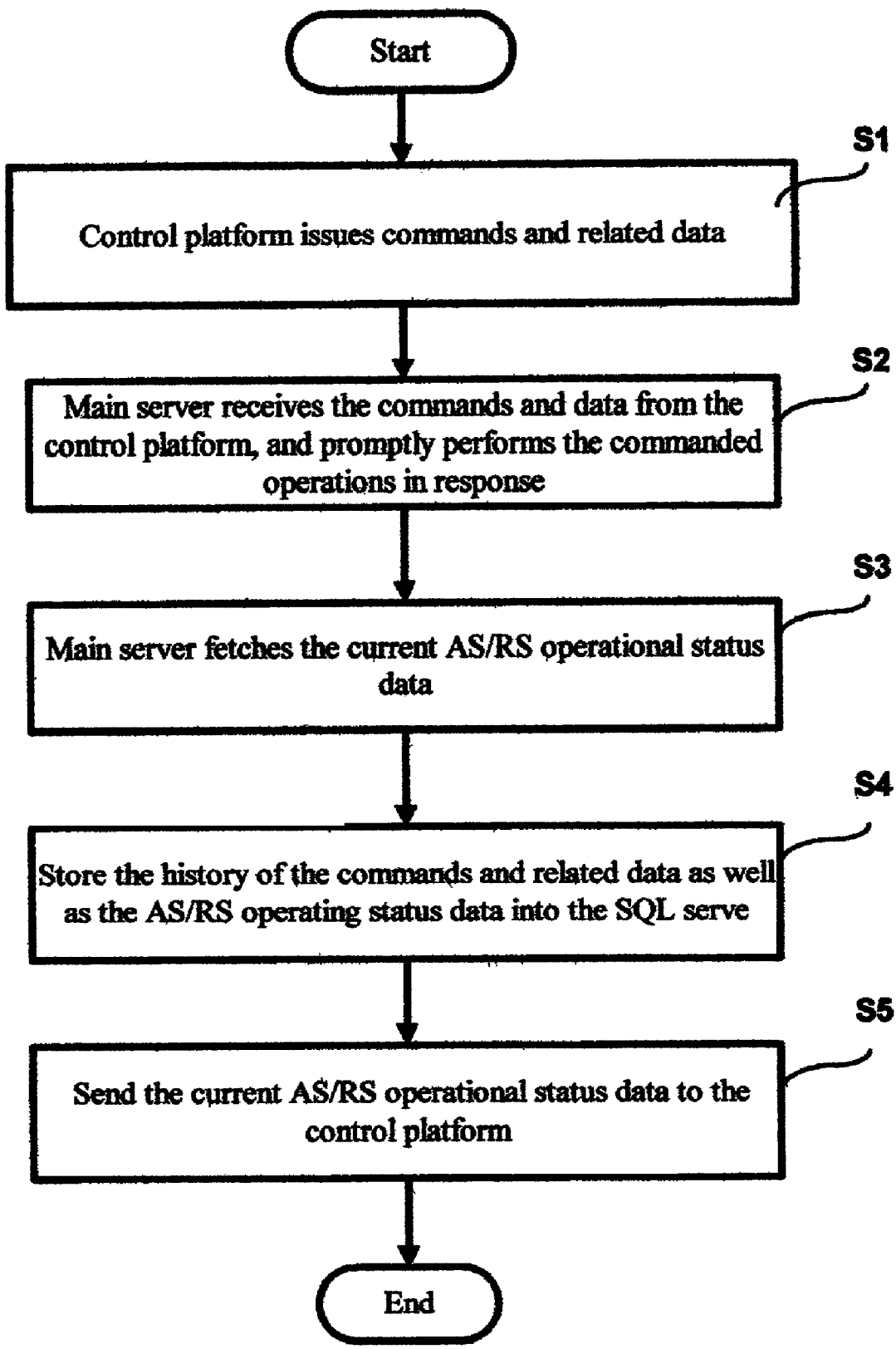
FIG. 3 is a flow diagram showing the procedural steps carried out by the AS/RS server system and method according to the invention.

FIG. 3 is a flow diagram showing the procedural steps carried out by the AS/RS server system and method according to the invention. As shown, the first step S1 is to perform a command/data input procedure, wherein the control platform 230 is used to input commands and related data which are then transferred directly via the TCP/IP communication interface 211 to the main server 210.

In the next step S2, as the main server 210 receives the user-issued commands and data from the control platform 230, it promptly performs the commanded operations in response.

In the next step S3, the main server 210 fetches the related inventory data from the AS/RS 10 and displays these data on the monitor screen (not shown) of the main server 210. An example of the data display is shown in FIG. 4A.

In the next step S4, the main server 210 stores the history of the user-issued commands and related data from the control platform 230 as well as the AS/RS operating status data into the SQL server 220.

In the next step S5, the main server 210 sends related AS/RS inventory management data to the control platform 230; and these data are then displayed on the monitor screen (not shown) of the control platform 230 for the user to review. An example of the data display is shown in FIG. 4B.

Figure 4A:
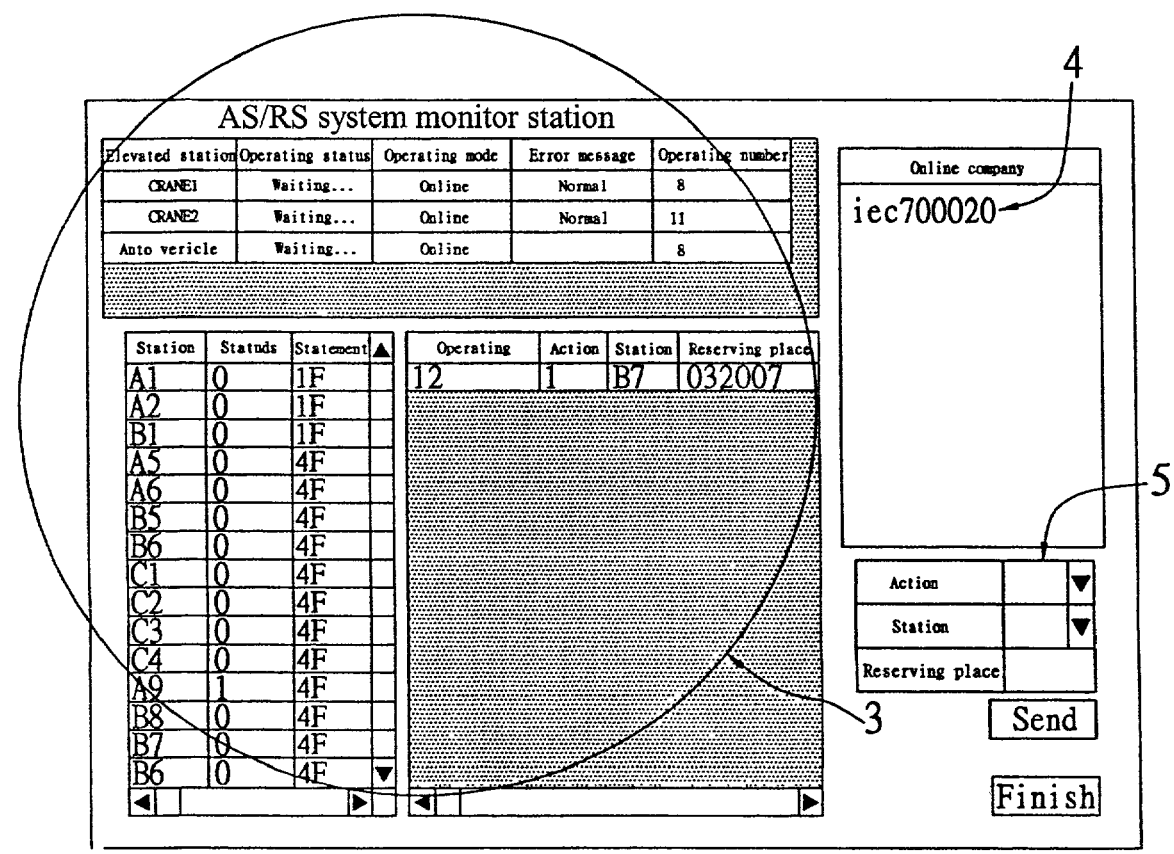
FIG. 4A is an illustration of an example of the user interface displayed on the monitor screen of the main server by the AS/RS server system and method according to the invention.
Figure 4B:
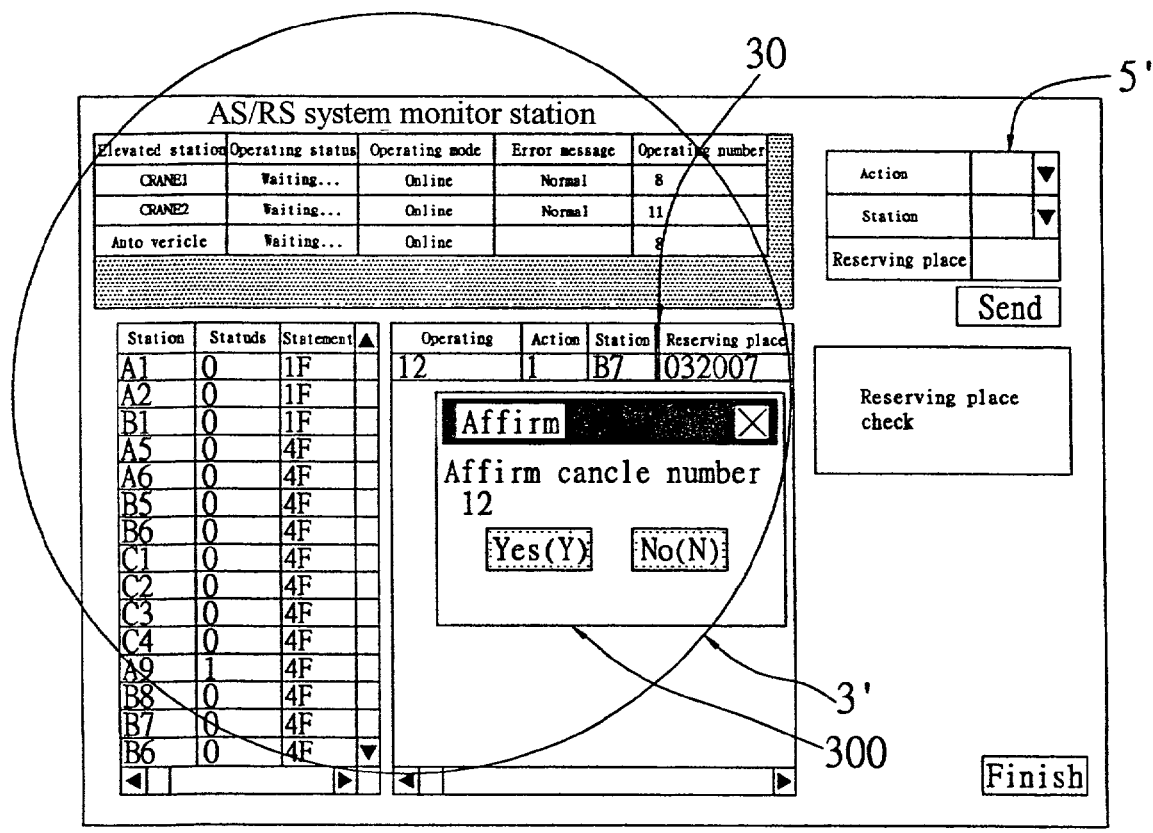
FIG. 4B is an illustration of an example of the user interface displayed on the monitor screen of the control platform by the AS/RS server system and method according to the invention.

FIG. 4A shows an example of the user interface displayed on the monitor screen (not shown) of the main server 210 by the AS/RS server system and method according to the invention; while FIG. 4B shows an example of the user interface displayed on the monitor screen (not shown) of the control platform 230.

Referring to FIG, 4A, in this user interface displayed on the main server 210, the reference numeral 3 indicates a data field used to show the current operating status of the AS/RS 10, wherein the number "0" indicates, for example, that the associated station has no pallet, whereas the number "1" indicates that the associated station has one or more pallets. In addition, the reference numeral 4 indicates a data field used to show which control platform 230 is currently online (in the case of a plurality of control platforms are installed); and the reference numeral 5 indicates a data input field which allows the main server 210 to receive command input from the user and transfers the input command to the AS/RS 10.

Referring to FIG. 4B, in this user interface displayed on the control platform 230, the reference numeral 3' indicates a data field which shows the same information displayed on the main server 210; i.e., when the main server 210 receives AS/RS operating status data, it promptly transfers these data in real-time synchronization to the control platform 230, allowing the user at the control platform 230 to immediately browse these data without having to wait until the main server 210 refreshes the data stored in the SQL server 220 as in the case of the prior aft. Besides, as the user at the control platform 230 selects commands on the inventory management data table 30, a dialog box 300 will appear, asking whether the user wants to delete the current station. Furthermore, the reference numeral 5' indicates a data input field which allows the control platform 230 to receive command input from the user and transfers the input command to the main server 210 to cause the main server 210 to control the AS/RS 10 to operate accordingly.

Compared to the prior art, the AS/RS server system and method according to the invention has the following advantages.

First, the AS/RS server system and method according to the invention allows the utilization of DCOM (Distributed Component Object Model) modules for control of the data exchange among the, main server 210, the SQL server 220, and the control platform 230, allowing the invention to be implemented without the use of QEODBC drivers, thereby eliminating the problems caused by the use of QEODBC driver in the prior art.

Second, the AS/RS server system and method according to the invention allows real-time synchronization in the data transmission between the control platform 230 and the AS/RS 10, thereby allowing the AS/RS operation to be more efficient than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A server system for use with an automatic storage and retrieval system to allow a user to perform AS/RS controls, which comprises:
    at least one control platform, which allows the user to issue AS/RS commands and access related inventory management data;
    a main server, which is linked to the automatic storage and retrieval system, for monitoring the automatic storage and retrieval system and controlling the operation of the automatic storage and retrieval system in accordance with the user-issued commands and data from the control platform;
    an SQL server, which is linked to the main server, for registering the history of user-issued commands to the automatic storage and retrieval system and related AS/RS operating status data;
    a communication interface, which is connected between the control platform and the main server, for performing direct data transfer between the control platform and the main server; and
    a distributed component object model (DCOM) module for controlling data exchange among the main server, the SQL server, and the control platform;
    wherein, due to control by the DCOM module, the data exchange is effected without having to use a QEODBC driver.

2. The server system of claim 1, wherein the communication interface is a TCP/IP communication interface.

3. The server system of claim 2, wherein the main server is capable of receiving user-input commands and data in place of the control platform.

4. The server system of claim 1, wherein the communication interface is a point-to-point multiplex communication interface.

5. The server system of claim 4, wherein the main server is capable of receiving user-input commands and data in place of the control platform.

6. The server system of claim 1, wherein the main server is capable of receiving user-input commands and data in place of the control platform.

7. The server system of claim 1, wherein data transmission between the control platform and the automatic storage and retrieval system is capable of real-time synchronization.

8. The server system of claim 7, wherein the communication interface is a TCP/IP communication interface.

9. The server system of claim 7, wherein the communication interface is a point-to-point multiplex communication interface.

10. The server system of claim 7, wherein the main server is capable of receiving user-input commands and data in place of the control platform.

11. The server system of claim 7, wherein the SQL server is not linked to the control platform.

12. A server method for use on an automatic storage and retrieval system to allow a user to perform AS/RS controls, which comprises the steps of:
    linking a main server to the automatic storage and retrieval system;
    linking an SQL server to the control platform;
    connecting the main server by means of a communication interface to the control platform;
    receiving user-input commands and related data from the control platform;
    transferring the user-input commands and data from the control platform via the communication interface to the main server, causing the control platform to control the automatic storage and retrieval system to operate in accordance with the user-input commands and data;
    displaying AS/RS operating status data on the control platform;
    registering the AS/RS operating status data into the SQL server;
    transferring the AS/RS operating status data from the main server to the control platform;
    displaying the AS/RS operating status data on the control platform; and
    providing a distributed component object model (DCOM) module to control data exchange among the main server, the SQL server, and the control platform;
    wherein, due to control by the DCOM module, the data exchange is effected without having to use a QEODBC driver.

13. The server method of claim 12, wherein the communication interface is a TCP/IP communication interface.

14. The server method of claim 13, wherein the main server is capable of receiving user-input commands and data in place of the control platform.

15. The server method of claim 12, wherein the communication interface is a point-to-point multiplex communication interface.

16. The server method of claim 15, wherein the main server is capable of receiving user-input commands and data in place of the control platform.

17. The server method of claim 12, wherein the main server is capable of receiving user-input commands and data in place of the control platform.

18. The server method of claim 12, wherein data transmission between the control platform and the automatic storage and retrieval system is capable of real-time synchronization.

19. The server method of claim 18, wherein the communication interface is a TCP/IP communication interface.

20. The server method of claim 18, wherein the communication interface is a point-to-point multiplex communication interface.

21. The server method of claim 18, wherein the main server is capable of receiving user-input commands and data in place of the control platform.

* * * * *